(12) United States Patent
Lynn (10) Patent No.: US 7,089,345 B1
(45) Date of Patent: Aug. 8, 2006

(54) METHOD AND APPARATUS FOR DUAL PORTING A SINGLE PORT SERIAL ATA DISK DRIVE

(75) Inventor: William E. Lynn, Longmont, CO (US)

(73) Assignee: Adaptec, Inc., Milpitas, CA (US)

( * ) Notice: Subject to any disclaimer, the term of this patent is extended or adjusted under 35 U.S.C. 154(b) by 0 days.

(21) Appl. No.: 10/131,387

(22) Filed: Apr. 23, 2002

(51) Int. Cl.
*G06F 13/00* (2006.01)

(52) U.S. Cl. .................................... 710/316; 711/114

(58) Field of Classification Search ................ 710/100, 710/305, 316–317, 240–241, 107; 370/351, 370/422, 423; 326/30; 711/114
See application file for complete search history.

(56) References Cited

U.S. PATENT DOCUMENTS

| | | | | |
|---|---|---|---|---|
| 4,747,047 A | * | 5/1988 | Coogan et al. ................ 710/38 |
| 4,817,147 A | * | 3/1989 | Gorniak et al. ............. 380/266 |
| 5,155,845 A | * | 10/1992 | Beal et al. ...................... 714/6 |
| 5,183,749 A | | 2/1993 | Ramos et al. |
| 5,245,320 A | | 9/1993 | Bouton ........................ 345/167 |
| 5,313,369 A | | 5/1994 | Lewis et al. |
| 5,483,423 A | | 1/1996 | Lewis et al. |
| 5,487,160 A | * | 1/1996 | Bemis ......................... 711/114 |
| 5,621,899 A | | 4/1997 | Gafford et al. ............. 395/299 |
| 5,701,513 A | * | 12/1997 | Kaneko .......................... 710/6 |
| 5,790,782 A | | 8/1998 | Martinez et al. |
| 5,814,762 A | | 9/1998 | Tusler et al. |
| 5,829,048 A | * | 10/1998 | Ofer et al. ................... 711/166 |
| 5,867,640 A | * | 2/1999 | Aguilar et al. ................. 714/6 |
| 5,892,973 A | | 4/1999 | Martinez et al. |
| 5,956,665 A | | 9/1999 | Martinez et al. |
| 6,044,207 A | | 3/2000 | Pecone et al. .............. 395/309 |
| 6,050,658 A | | 4/2000 | O'Sullivan et al. |
| 6,061,244 A | | 5/2000 | O'Sullivan et al. |
| 6,073,218 A | | 6/2000 | DeKoning et al. .......... 711/150 |
| 6,076,142 A | | 6/2000 | Corrington et al. ......... 711/114 |
| 6,115,814 A | | 9/2000 | Lieber et al. |
| 6,119,183 A | * | 9/2000 | Briel et al. .................. 710/316 |
| 6,154,850 A | | 11/2000 | Idleman et al. |
| 6,188,973 B1 | | 2/2001 | Martinez et al. |
| 6,260,120 B1 | * | 7/2001 | Blumenau et al. .......... 711/152 |
| 6,370,605 B1 | * | 4/2002 | Chong, Jr. .................... 710/33 |
| 6,381,642 B1 | | 4/2002 | O'Donnell et al. ......... 709/224 |
| 6,449,680 B1 | | 9/2002 | Sanders et al. ............. 710/346 |

(Continued)

OTHER PUBLICATIONS

"Multi-Thread Sequencing in a Small Computer System Interface Environment" IBM Technical Disclosure Bulletin, Sep. 1, 1994, vol. 37, Issue No. 9, pp. 497-500.*

(Continued)

*Primary Examiner*—Paul R. Myers
(74) *Attorney, Agent, or Firm*—Sheridan Ross P.C.

(57) ABSTRACT

A method and an apparatus for providing multiple ports to a single port device are provided. According to the present invention, single port devices that are incapable of communicating across a shared communication bus, and therefore require a point to point communication channel, may be interconnected to multiple hosts using a switch assembly. The switch assembly selectively establishes a communication path between a single host and a device. Additionally, the present invention provides a method and apparatus by which computer subsystems, such as RAID storage subsystems, may be implemented using inexpensive storage devices. Furthermore, the present invention provides a method and apparatus for providing a high reliability computer subsystem by configuring the subsystem such that no single active component failure will result in the failure of the entire subsystem.

22 Claims, 5 Drawing Sheets

U.S. PATENT DOCUMENTS

| | | |
|---|---|---|
| 6,532,547 B1 | 3/2003 | Wilcox |
| 6,542,961 B1 * | 4/2003 | Matsunami et al. ........ 711/114 |
| 6,578,158 B1 * | 6/2003 | Deitz et al. .................... 714/11 |
| 6,658,504 B1 | 12/2003 | Lieber et al. |
| 2002/0004342 A1 | 1/2002 | Mullins et al. |
| 2002/0008427 A1 | 1/2002 | Mullins et al. |
| 2002/0010883 A1 | 1/2002 | Coffey et al. |
| 2002/0035669 A1 * | 3/2002 | Baek et al. ................. 711/114 |
| 2002/0043877 A1 | 4/2002 | Mullins et al. |
| 2002/0044561 A1 | 4/2002 | Coffey |
| 2002/0044562 A1 | 4/2002 | Killen, Jr. et al. |
| 2002/0046276 A1 | 4/2002 | Coffey et al. |
| 2002/0054477 A1 | 5/2002 | Coffey et al. |
| 2002/0087751 A1 * | 7/2002 | Chong, Jr. ................... 710/33 |
| 2002/0129182 A1 | 9/2002 | Coffey |
| 2002/0129232 A1 | 9/2002 | Coffey |
| 2002/0159311 A1 * | 10/2002 | Coffey et al. ............... 365/200 |
| 2003/0056048 A1 | 3/2003 | Mullins et al. |

OTHER PUBLICATIONS

"Information Technology- Small Computer System Interface—2" ANSI X3. 131, Sep. 7, 1993, Chapter 6, pp. 41-69.*

* cited by examiner

METHOD AND APPARATUS FOR DUAL PORTING A SINGLE PORT SERIAL ATA DISK DRIVE

FIELD OF THE INVENTION

The present invention relates to providing redundant computer systems. In particular, the present invention relates to the use of multiple hosts or controllers in connection with a single port device.

BACKGROUND OF THE INVENTION

Computer systems require reliable storage for large amounts of data. Often, redundant arrays of independent (or inexpensive) disks (RAID) devices are used to provide such storage. In general, RAID devices involve storing data on a plurality of hard disk drives. The use of RAID techniques increases the reliability and/or speed of data storage and retrieval. Although there are various schemes, or RAID levels, according to which data may be stored and retrieved, RAID systems all generally involve the distribution of data across multiple storage devices. The distribution and retrieval of data from the devices is usually performed by a controller interconnected to each of the storage devices in the RAID system.

In order to further enhance the fault tolerant aspects of data storage, it is desirable to ensure that there is no single point of failure within a storage subsystem. Therefore, in addition to distributing data among a number of storage devices, high reliability storage systems have used two controllers, to allow the storage system to continue to operate even if a fault develops with respect to the primary controller. In such systems, the storage devices must be capable of passing data to and receiving data and commands from either of the controllers. Accordingly, high reliability storage systems have typically used small computer system interface (SCSI) or Fibre Channel type storage devices, that can be operated on a shared bus and/or provide multiple ports for interconnecting to controllers.

Although SCSI and fiber channel compliant devices facilitate the use of redundant controllers in a storage system, such devices are typically much more expensive than devices that are not capable of operating in connection with a shared communication bus. However, less expensive devices, such as those adhering to the advanced technology attachment (ATA) or serial ATA (SATA) standards must be interconnected with a controller in a point to point relationship (i.e. over a dedicated signal line). Accordingly, high reliability systems, such as RAID storage systems, using redundant device controllers have been required to use the more expensive SCSI or Fibre Channel devices.

Therefore, it would be desirable to provide for redundant or multiple hosts or controllers in connection with inexpensive devices. Furthermore, it would be advantageous to allow devices incapable of operation on a shared bus to be interconnected to a number of hosts or controllers in a way that is reliable, and that is itself relatively inexpensive to implement.

SUMMARY OF THE INVENTION

In accordance with the present invention, a method and an apparatus for interconnecting single port devices to a plurality of hosts or controllers are provided. In general, the present invention provides a switch assembly that allows a single device to be selectively interconnected to one of a plurality of hosts.

According to an embodiment of the present invention, a first port of a three-port switch is interconnected to a single port device. The second port is interconnected to a first host, and the third port is interconnected to a second host. Accordingly, by operation of the switch, the single port device may be selectively interconnected to either the first or second host.

According to a further embodiment of the present invention, a switch assembly capable of operating in a single threaded mode is provided. According to such an embodiment, a switch assembly is operated to interconnect a first port associated with a device to a second port associated with a host in response to a command or data received at the second port of the switch assembly. The interconnection between the device and the first host may be maintained until a command or data is passed from the device to the first host in response to the command or data received at the second port. Similarly, the switch may interconnect the first port to a third port in response to a command or data received at the third port from a second host. The interconnection between the first and third ports may be maintained until a command or data is passed from the device to the second host through the switch assembly. According to a further embodiment of the present invention, if a command or data is received at either of the second or third ports while a command or data from the device in response to a command or data received at the other of the ports is pending or in progress, the host initiating the later arriving command or data will be signaled that the switch assembly is not ready to receive the command or data. Such a signal may be in the form of a failure to issue a ready signal to the host.

In accordance with another embodiment of the present invention, a switch assembly capable of operating in a queued environment is provided. According to such an embodiment, commands or data passed between a first host and a device may be associated with a first queue tag. Similarly, commands and data passed between a second host and the device may be associated with a second queue tag. A switch assembly for selectively interconnecting the device to either the first host or the second host operates to pass commands or data from the device associated with the first queue tag to the first device, while passing commands and data associated with the second queue tag to the second device.

Based on the foregoing summary, a number of salient features of the present invention are readily discerned. A method and an apparatus for interconnecting a single port device to a number of hosts are provided. Accordingly, the present invention allows for the use of redundant hosts in connection with relatively inexpensive, single port devices.

Additional advantages of the present invention will become readily apparent from the following discussion, particularly when taken together with the accompanying drawings.

DETAILED DESCRIPTION

Figure 1:
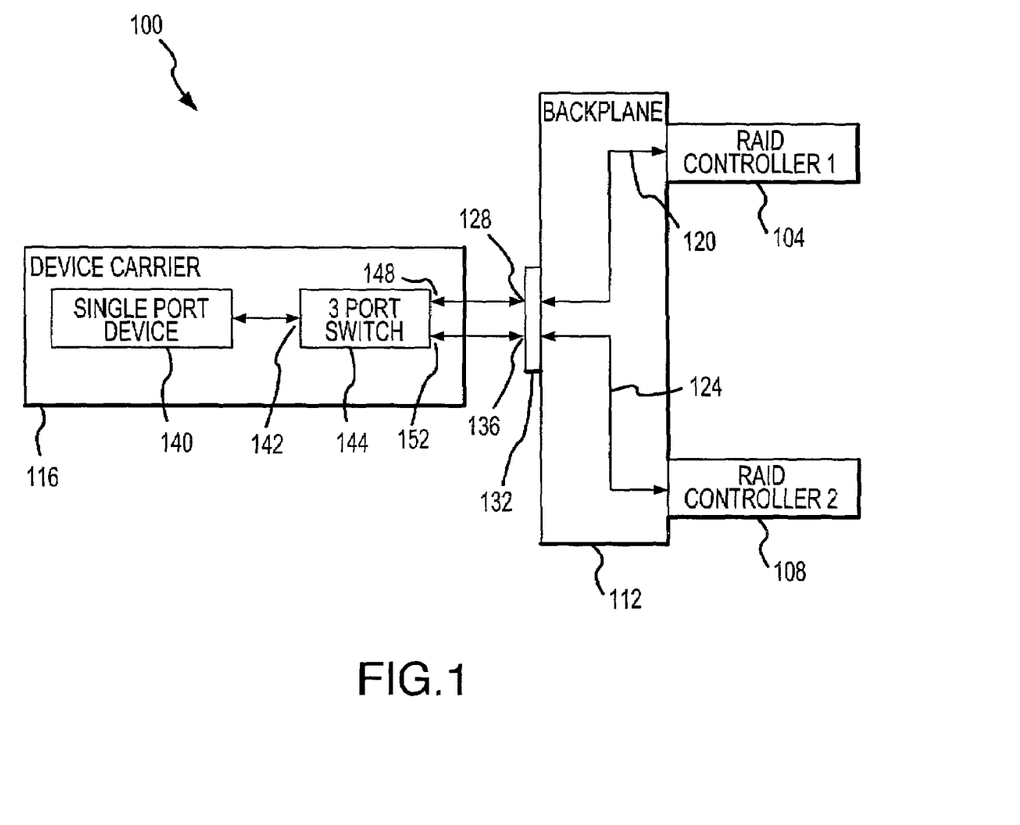
FIG. 1 is a block diagram depicting a single port device interconnected to a plurality of hosts in accordance with an embodiment of the present invention.

With reference now to FIG. 1, a computer subsystem 100 in accordance with an embodiment of the present invention is depicted. The subsystem 100 generally includes first 104 and second 108 hosts, also referred to herein as initiators or controllers. In addition, the subsystem 100 includes a signal back plane 112, and a device carrier 116.

The signal back plane 112 provides a first back plane signal path 120, and a second back plane signal path 124. With respect to a first end of the first back plane signal path 120, the signal back plane 112 provides an interconnection to the first host 104. At a second end of the first back plane signal path 120, the signal back plane 112 provides a port 128, as part of a dual port connector 132. With respect to a first end of the second back plane signal path 124, the signal back plane 112 provides an interconnection to the second host 108. At a second end of the second back plane signal path 124, a port 136 is provided as part of the dual port connector 132.

The device carrier 116 generally includes a single port device 140 interconnected to a first port 142 of a switch assembly 144. The device carrier 116 may be configured to facilitate the interconnection of the device 140 and associated switch assembly 144 to the signal back plane 112. For example, the device carrier 116 may be configured to be slidably received by an enclosure or rack interconnected to or incorporating the signal backplane 112 and provided as part of a subsystem 100, such as a RAID storage system.

Furthermore, by positioning the device carrier 116 in a receiving slot of an enclosure or rack, an interconnection between second 148 and third 152 ports, and corresponding ports 128, 136 on the dual port connector 132 of the signal back plane 112, may be established. The subsystem 100 may also be implemented without an enclosure or rack.

The single port device 140 may include any device that requires a point to point, dedicated signal path for communications. That is, the single port device 140 can be a device that is incapable of operation in connection with a shared communication bus, and that provides a single port for interconnecting the device 140 to a communication channel.

The switch assembly 144 selectively establishes a signal path between the first port 142 and either the second port 148 or the third port 152 of the switch assembly 144. In the subsystem 100 illustrated in FIG. 1, it can therefore be appreciated that when the switch assembly 144 is in a first operating mode, the first port 142 is interconnected to the second port 148 of the switch assembly 144. So configured, a communication channel or signal path is established between the single port device 140 and the first host 104. When the switch assembly 144 is in a second operating mode, the first port 142 is interconnected to the third port 152. In this second operating mode, the switch assembly 144 enables a signal or communication path between the single port device 140 and the second host 108. Accordingly, it can be appreciated that the subsystem 100 allows two different hosts 104, 108 to be interconnected to a single port device 140. Furthermore, it can be appreciated that the subsystem 100 allows all active components (e.g., the hosts 104, 108, devices 140, and switch assemblies 144) associated with the system 100 to be selectively interconnected to the subsystem 100, and is configured such that no one active component could cause the entire subsystem 100 to fail.

Figure 2:
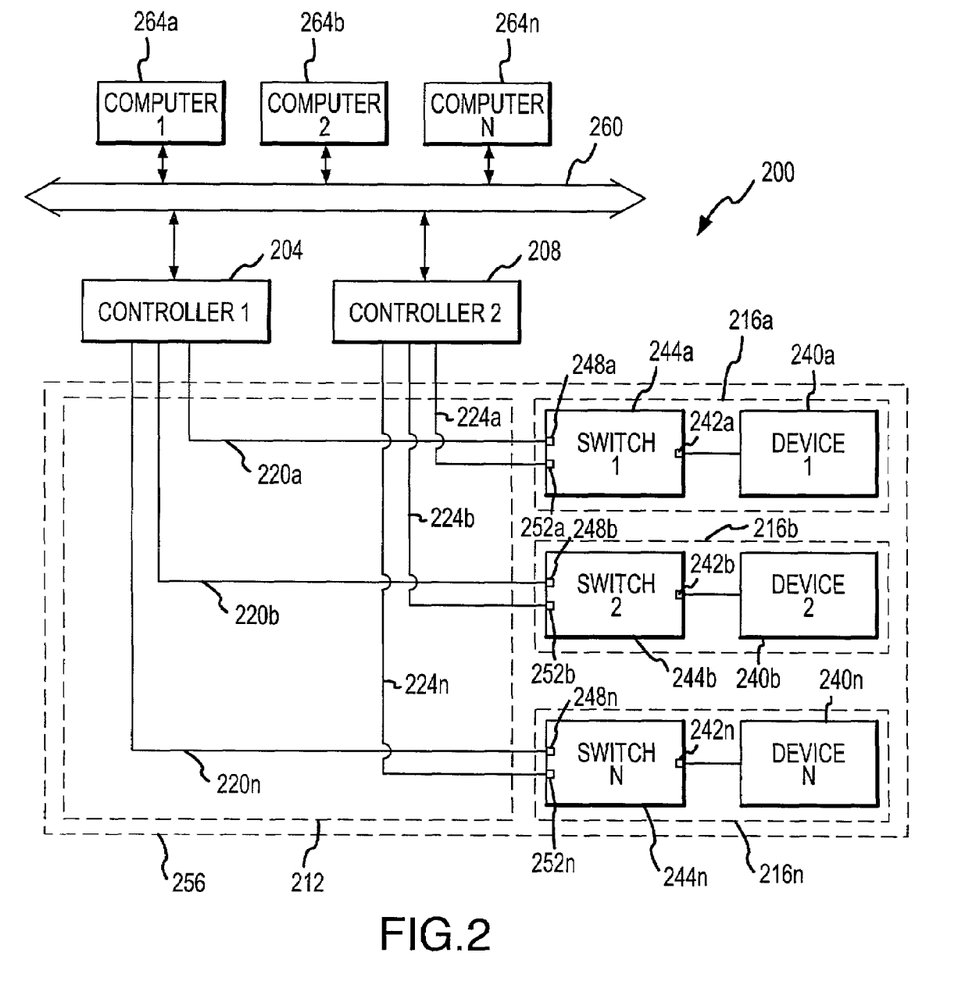
FIG. 2 is a block diagram depicting a plurality of single port devices interconnected to a plurality of hosts in accordance with an embodiment of the present invention.

With reference now to FIG. 2, a computer subsystem 200 in accordance with another embodiment of the present invention is illustrated. The subsystem 200 interconnects a plurality of device carriers 216a, 216b, and 216n, each having an associated single port storage device 240, to first 204 and second 208 controllers. The subsystem 200 in FIG. 2 is therefore illustrative of a RAID storage subsystem with redundant RAID controllers 204, 208 and a plurality of storage devices 240. Accordingly, the signal back plane 212 of the system 200 provides a plurality of first backplane signal paths 220a, 220b, and 220n, and a plurality of second backplane signal paths 224a, 224b and 224n.

The storage devices 240 may comprise hard disk drives that require a point to point connection to an associated controller. For example, the storage devices 240 may comprise advanced technology attachment (ATA) or serial ATA (SATA) devices. Each device 240 may be selectively interconnected to either the first 204 or the second controller 208. In particular, the switch assemblies 244 operate to selectively interconnect an associated device 240 to the first controller 204. For example, when a first switch assembly 244a is in a first mode of operation, a first device 240a may be interconnected to the first controller 204 via a signal path comprising the first backplane signal path 220a, the second port 248a of the switch assembly 244a, and the first port 242a of the switch assembly 244a. When the switch assembly 244a is in a second mode of operation, the device 240a may be interconnected to the second controller 208 via a signal path comprising the second backplane signal path 224a, the third port 252a of the switch assembly 244a, and the first port 242a of the switch assembly 244a.

As depicted in FIG. 2, the signal backplane 212 and the device carriers 216 may be interconnected to a rack 256 when the system 200 is operative. Also illustrated in FIG. 2 is a communication bus or computer network 260 interconnecting the subsystem 200 to a plurality of computers 264. Accordingly, FIG. 2 also illustrates an example computer system 264 comprising a computer storage subsystem 200 in accordance with an embodiment of the present invention. As can be appreciated by one of skill in the art, the communication bus or computer network 260 may include any network suitable for interconnecting computers and computing devices, such as an ethernet network. Furthermore, the computer network 260 may comprise a communications bus used in connection with communications involving peripheral computer devices, such as a peripheral component interconnect (PCI) communication bus.

The computer subsystem illustrated in FIG. 2 provides a RAID storage subsystem that protects against data loss due to a single point of failure. In particular, the subsystem 200 illustrated in FIG. 2 does not include any active devices that would render the subsystem 200 inoperative if any one device were to fail. For example, the inclusion of first 204 and second 208 RAID controllers provides redundancy should the primary controller (e.g., the first controller 204) fail. In addition, the data is distributed among the devices 240 such that the loss of any one device does not result in a loss of the data stored on that device 240. To facilitate the replacement of a failed device 240 or switch assembly 244, each device 240 and its associated switch assembly 244 is interconnected to an associated device carrier 216 that can be removed from the rack 256 and replaced without resulting in a total failure of the subsystem 200. Furthermore, it will be noted that the backplane 212 contains no active components, removing the backplane 212 as a potential source of system failure.

Figure 3:
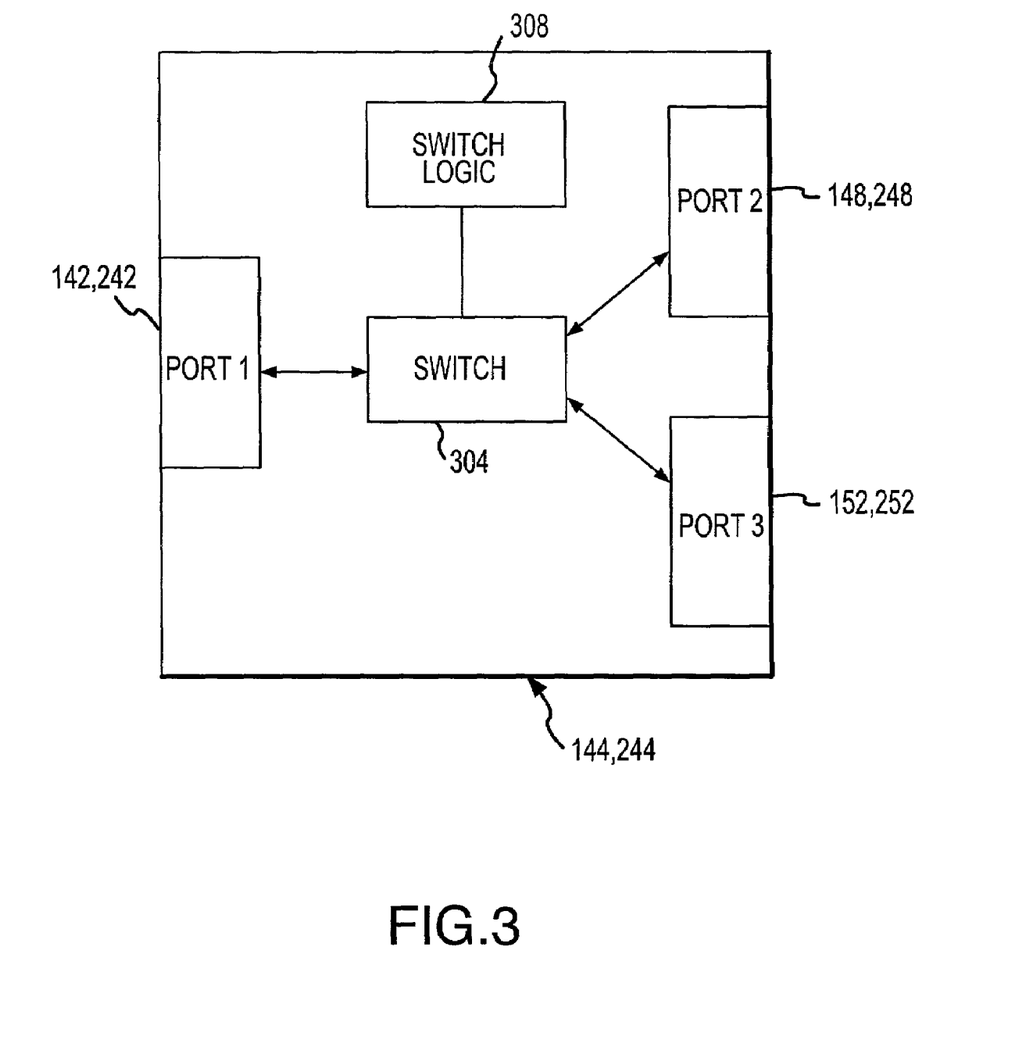
FIG. 3 is a functional block diagram depicting a switch assembly in accordance with an embodiment of the present invention.

With reference now to FIG. 3, a switch assembly 144, 244 is depicted in functional block diagram form. As shown in FIG. 3, the switch assembly 144, 244 comprises a first port 142, 242, a second port 148, 248, and a third port 152, 252. The first port 142, 242 may be selectively interconnected to either the second port 148, 248 or the third port 152, 252 by a switch block 304. Switch logic 308 controls the operation of the switch block 304.

The various ports 142, 242, 148, 248, 152, 252 may comprise mechanical interconnections for mating the switch assembly 144, 244 to complementary connectors that are, for example, included as part of the backplane 112, 212, and/or as part of the device carrier 116, 216. The switch 304 may provide a logical or physical interconnection between the first port 142, 242 and either the second port 148, 248 or the third port 152, 252. The switch logic 308 may comprise a simple state machine implemented using a controller or a simple programmable logic device.

Figure 4:
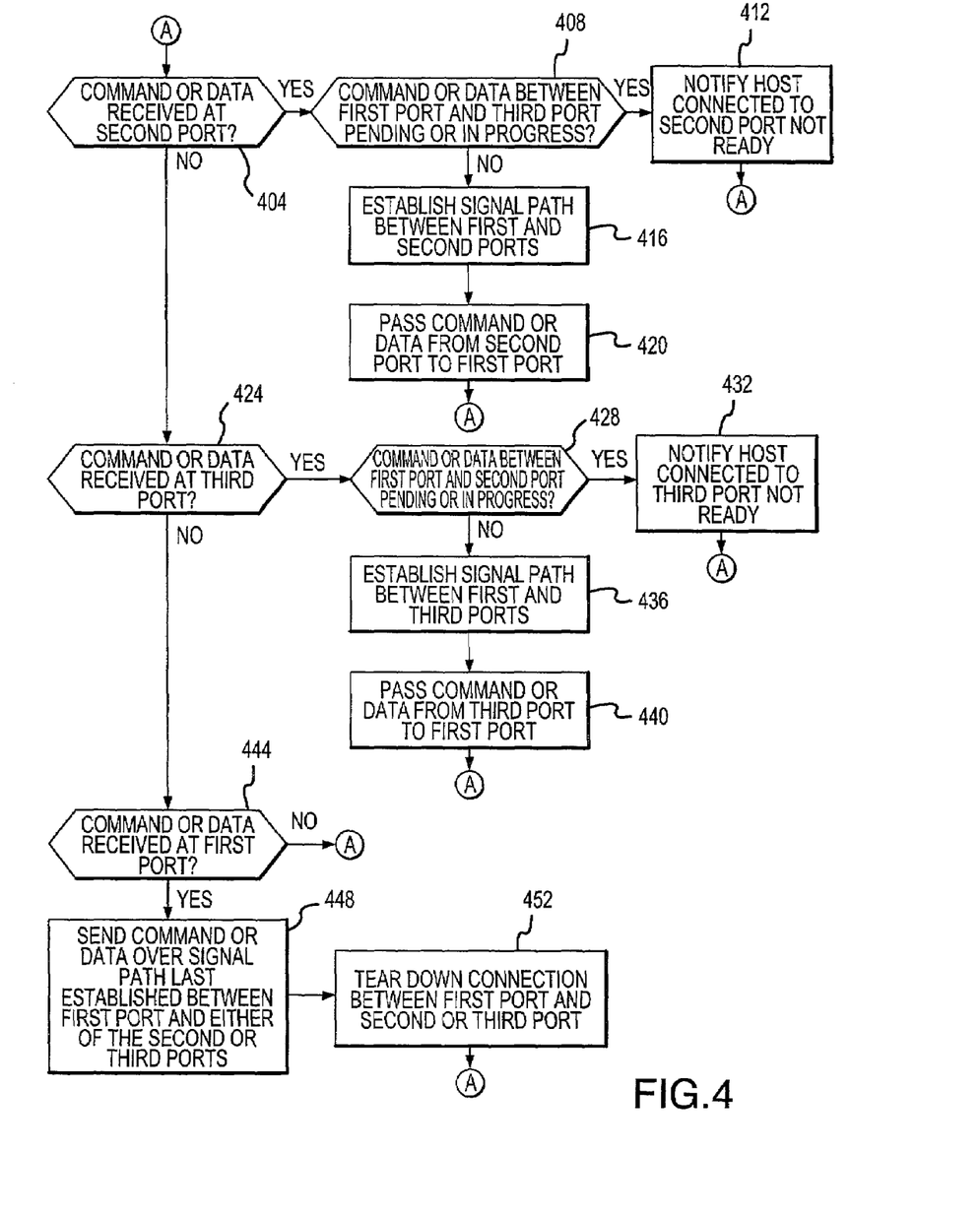
FIG. 4 is a flow chart depicting the operation of a subsystem in accordance with an embodiment of the present invention.

With reference now to FIG. 4, a flow chart depicting the operation of a system 100, 200 in accordance with an embodiment of the present invention is illustrated. In particular, the process steps illustrated in FIG. 4 may be considered with respect to a single switch assembly 144, 244 (e.g., switch assembly 244a in FIG. 2). From an initial starting point, labeled A in FIG. 4, a determination is made as to whether a command or data was received at the second port 148, 248 of the switch assembly 144, 244 (step 404). If a command or data was received at the second port 148, 248, a determination is made as to whether a transfer of a command or data between the first port 142, 242 and the third port 152, 252 of the switch assembly 144, 244 is pending or in progress (step 408). If such a transfer is pending or in progress, the host interconnected to the second port 148, 248 (i.e. the first host 104, 204) is notified that the system 100, 200 is not ready to pass the command or data received at the second port 148, 248 to the device 140, 240 (step 412). Such notification may be in the form of a failure to issue a ready signal from the switch assembly 144, 244 to the first controller 204. The system may then return to point A.

If at step 408 it is determined that no transfer of a command or data between the first port 142, 242 and the third port 152, 252 is pending or in progress, a signal path is established between the first 142, 242 and second 148, 248 ports (step 416). That is, the switch assembly 144, 244 is operated to interconnect the first port 142, 242 to the second port 148, 248. The command or data may then be passed from the second port 148, 248 to the first port 142, 242 (step 420). The system may then return to point A.

If a command or data is not received at the second port 148, 248, a determination is made as to whether a command or data has been received at the third port 152, 252 (step 424). If a command or data was received at the third port 152, 252, a determination is made as to whether a transfer of a command or data between the first port 142, 242 and second port 148, 248 is pending or in progress (step 428). If such a transfer is pending, the host connected to the third port 152, 252 (i.e. the second host 108, 208) is notified that the third port 152, 252 is not ready (step 432). Such notification may be in the form of a failure to issue a ready signal to the host 108, 208. The system may then return to point A.

If a transfer of a command or data between the first port 142, 242 and the second port 148, 248 is not pending or in progress, a signal path is established between the first 142, 242 and third 152, 252 ports (step 436). The command or data is then passed from the third port 152, 252 to the first port 142, 242 (step 440). The system may then return to point A.

If at step 424 it is determined that a command or data has not been received at the third port 152, 252, a determination is made as to whether a command or data was received at the first port 142, 242 (step 444) (i.e. from a device 140, 240). If no such command or data was received, the system returns to point A. If a command or data was received at the first port 152, 252, the command or data is sent through the switch assembly 144, 244 over the signal path last established by the switch assembly 144, 244 between the first 142, 242 and either of the second 148, 248 or third 152, 252 ports (step 448). That is, if the previous transfer of a command or data handled by the switch assembly was made between the second port 148, 248 and first port 142, 242, the command or data received at the first port 142, 242 will be routed to the second port 148, 248. Conversely, if the previous transfer of a command or data handled by the switch assembly 144, 244 was made between the third port 152, 252 and the first port 142, 242, then the command or data received at the first port 142, 242 is passed to the third port 152, 252. At step 452, the connection between the first port 142, 242 and the second 148, 248 or third ports 152, 252 is torn down. The system may then return to point A.

From the description given above, it can be appreciated that an embodiment of the present invention maintains an interconnection between a device 140, 240 and a controller 104, 204 or 108, 208 until a command or data is received in reply at the first port 142, 242 in reply to the previous command or data received at the second port 148, 248 or third port 152, 252. Accordingly, a command or data received at the first port 142, 242 of a switch assembly 144, 244 is passed to the port that received the previous command or data from a controller 104, 204 or 108, 208.

Figure 5:
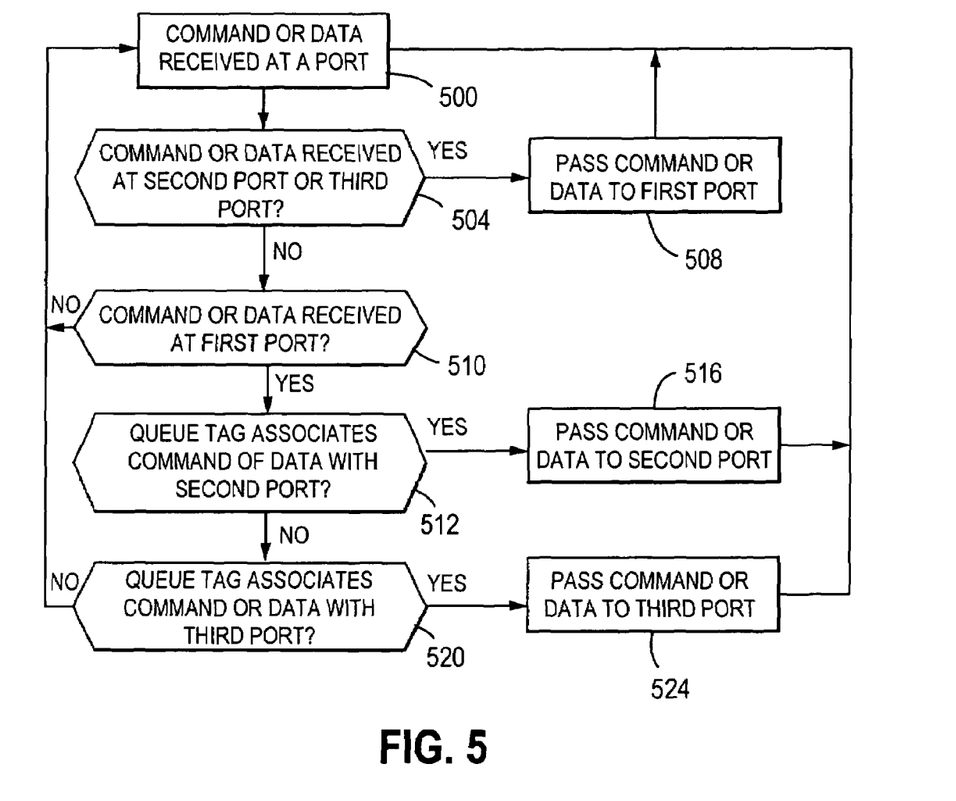
FIG. 5 is a flow chart depicting the operation of a subsystem in accordance with another embodiment of the present invention.

With reference now to FIG. 5, a flow chart depicting the operation of a subsystem 100, 200 in accordance with another embodiment of the present invention is illustrated. Initially, at step 500, a command or data is received at a port of a switch assembly 144, 244. At step 504, a determination is made as to whether the command or data was received at the second port 148, 248 or the third port 152, 252 of the switch assembly 144, 244. If the command or data was received at the second port 148, 248 or the third port 152, 252, the command or data is passed to the first port 142, 242 of the switch assembly (step 508). The system then returns to step 500.

If the command or data was not received at the second port 148, 248 or the third port 152, 252, a determination is made as to whether the command or data was received at the first port 142, 242 (i.e. from a device 140, 240) (step 510). If the command or data was received at the first port 142, 242, a determination is made as to whether a queue tag received with the command or data associates that command or data with the second port 148, 248 (step 512). If the queue tag does associate the command or data with the second port 148, 248, that command or data is passed to the second port 148, 248 (step 516). The system then returns to step 500.

If a queue tag received with the command or data at the first port 142, 242 associates that command or data with the third port 152, 252 (step 520) the command or data is passed to the third port 152, 252 (step 524). The system then returns to step 500.

If no queue tag associating the command or data with the third port 152, 252 is detected at step 520, the system returns to step 500.

From the description set forth above with respect to FIG. 5, it can be appreciated that an embodiment of the present invention may utilize queue tags to direct commands or data received at the first port 142, 242 to either the second port 148, 248 or the third port 152, 252. Furthermore, it can be appreciated that the device 140, 240 is not required to recognize queue tags. Instead, a queue tag provided together with a command or data is recognized by the switch logic 308 and an appropriate path through the switch assembly 144, 244 is established.

If a command or data is received at any one of the ports provided as part of a switch assembly 144, 244 while a data or command is being transmitted between two other of the ports of the switch assembly 144, 244, a not ready signal may be provided by the switch assembly 144, 244 to the host 104, 204, 108, 208 or device 140, 240 that sent the command or data to the switch assembly 144, 244. In addition, it should be appreciated that with any embodiment of the present invention, provisions may be made for handling a command or data received at one of the ports of a switch assembly 144, 244 at the same time that a command or data is received at another one of the ports of a switch assembly 144, 244. For example, an order of preference may be established between the various ports of a switch assembly 144, 244. In addition, it should be appreciated that the not ready signal described herein may comprise the absence of a ready signal. That is, the switch assembly 144, 244 may normally signal that it is ready to receive the command or data by providing a ready signal to the source of the command or data (e.g., a host 104, 204, 108, 208 or device 140, 240). However, if the switch assembly 144, 244 is not ready to receive a command or data, a ready signal may not be provided to the source of the command or data.

Although the foregoing describes use of the present invention in connection with ATA and SATA devices, and gives particular examples related to RAID subassemblies, it should be appreciated that the present invention is not so limited. For example, the present invention may be utilized in connection with providing multiple communication paths to multiple hosts for any device configured for communicating over a point to point communication channel. Furthermore, the present invention may be utilized in connection with providing multiple ports to multiple devices configured for interconnection to a host using a star topology. It will additionally be appreciated that the present invention is particularly useful in connection with the implementation of RAID subsystems utilizing inexpensive (e.g., ATA or SATA) hard disk drives. Furthermore, it should be appreciated that a switch assembly 144, 244 is not limited to having three communication ports. Rather, a switch assembly in accordance the present invention may have n ports, allowing n-1 hosts to be interconnected to a device, where n is equal to or greater than 3.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. An apparatus for providing a plurality of ports to a device using a point to point communications protocol, comprising:
 a first data port, wherein said first data port is adapted for interconnection to said device;
 a second data port;
 a first signal path, wherein said second data port may be selectively interconnected to said first data port by said first signal path;
 a third data port; and
 a second signal path, wherein said third data port may be selectively interconnected to said first data port by said second signal path, wherein data is passed over said first signal path in a first mode of operation, wherein data is passed over said second signal path in a second mode of operation, wherein a portion of said first signal path is also a portion of said second signal path, wherein said first mode of operation is entered in response to at least one of a command and data received at said second data port, and wherein at least one of a command and data is prevented from being passed over said second signal path until at least one of a command and data is received from said device at said first data port in reply to said at least one of a command and data received at said second data port.

2. The apparatus of claim 1, wherein a queue tag is associated with commands and data passed over said first and second signal paths, wherein communications having a first queue tag value are passed over said first signal path, and wherein communications having a second queue tag value are passed over said second signal path.

3. The apparatus of claim 1, further comprising:
 a first host interconnected to said first signal path; and
 a second host interconnected to said second signal path, wherein at least one of a command and data is passed between said device and said first host over said first signal path in said first mode of operation, and wherein at least one of a command and data is passed between said device and said second host over said second signal path in said second mode of operation wherein said first signal path is not operative to interconnect said first and second data ports while a transfer of a command or data using said second signal path is pending, and wherein said second signal paths is not operative to interconnect said first and third data ports while a transfer of a command or data using said first signal path is pending.

4. The apparatus of claim 3, wherein said first host comprises a first controller and wherein said second host comprises a second controller.

5. The apparatus of claim 3, wherein said first host comprises a first RAID controller, and wherein said second host comprises a second RAID controller.

6. The apparatus of claim 1, wherein said device comprises a storage device.

7. The apparatus of claim 1, wherein said device comprises a single port device.

8. The apparatus of claim 1, wherein said device comprises an SATA device.

9. The apparatus of claim 3, further comprising a RAID system back plane wherein said first signal path is interconnected to said first host by a first back plane signal path, and wherein said second signal path is interconnected to said second host by a second backplane signal path.

10. A data storage system, comprising:
a first device controller;
a second device controller;
a plurality of data storage devices, wherein each of said data storage devices requires point to point connection;
a plurality of switch assemblies, wherein each of said switch assemblies comprises at least first, second, and third data ports, wherein said switch assemblies operate to selectively interconnect said first port to one of said at least second and third ports, and wherein for each of said switch assemblies only one of said second and third ports is interconnected to a one of said data storage devices while a transfer of a command or data through said first port is pending;
a backplane, comprising:
 interconnections to said at least second and said third ports of said switch assemblies; and
 an interconnection to said first device controller,
 an interconnection to said second device controller;
 a plurality of first backplane signal paths, wherein said first device controller may communicate with a second port of any of said switch assemblies; and
 a plurality of second backplane signal paths, wherein said second device controller may communicate with a third port of any of said switch assemblies.

11. The data storage system of claim 10, wherein said first device controller comprises a RAID contoller, and wherein said second device controller comprises a RAID controller.

12. The data storage system of claim 10, wherein said data storage devices comprise SATA data storage devices.

13. The data storage system of claim 10, further comprising a plurality of carriers, wherein a one of said data storage devices and a one of said switches is interconnected to each of said carriers.

14. A method for providing point to point communications between a plurality of hosts and a device, comprising:
 establishing a first communication channel between said device and a first of said hosts in response to a communication received from said first host;
 passing at least one of a command and data between said device and said first host over said first communication channel; and
 establishing a second communication channel between said device and a second of said hosts in response to a communication received from said second host, wherein said device is incapable of operation on a shared bus,
 wherein said first and second communications channels are established by a switch assembly having a plurality of states, comprising:
 a first state, wherein communications between said device and said first host are enabled, wherein communications between said device and said second host are disabled, and wherein said first state is maintained at least until a communication is received by said switch from said device in reply to said communication from said first host; and
 a second state, wherein communication between said device and said second host are enabled, wherein communications between said device and said first host disabled, and wherein said second state is maintained at least until a communication is received from said device in reply to said communication from said second host.

15. The method of claim 14, further comprising:
 preventing establishment of a communication channel between said device and said second host in response to a communication received from said second host while a transfer of at least one of a command and data over said communication channel between said device and said first host is pending.

16. The method of claim 14, further comprising:
 passing at least one of a command and data from said device to said first host over said first communications channel.

17. The method of claim 14, wherein said states of said switch assembly further comprise:
 a third state, wherein no communications between said device and said first and second hosts are enabled.

18. The method of claim 14, wherein said first state is maintained until no transfer of at least one of a command and data between said device and said first host are pending.

19. The method of claim 14, wherein said switch assembly enters said second state in response to a communication from said second host.

20. The method of claim 14, wherein in response to at least one of a command and data received at said switch assembly from said second host while said switch assembly is in said first state and while a transfer of at least one of a command and data between said device and said first host is pending no ready signal is passed from said switch assembly to said second host, wherein said at least one of a command and data from said second host is not passed to said device.

21. The method of claim 14, wherein at least one of a command and data having an associated first queue tag is passed between said device and said first host, and wherein at least one of a command and data having an associated second queue tag is passed between said device and said second host.

22. The apparatus of claim 1, wherein only said first data port is adapted for interconnection to said device.

* * * * *